United States Patent [19]
Coutant

[11] Patent Number: 5,667,452
[45] Date of Patent: Sep. 16, 1997

[54] SPLIT TORQUE TRANSMISSION

[75] Inventor: Alan R. Coutant, Chillicothe, Ill.

[73] Assignee: Caterpillar Inc., Peoria, Ill.

[21] Appl. No.: 417,561

[22] Filed: Apr. 6, 1995

[51] Int. Cl.⁶ ............................. F16H 47/04; F16H 47/02
[52] U.S. Cl. ........................... 475/81; 475/80; 475/82; 475/72
[58] Field of Search ........................... 475/72, 80, 81, 475/82, 286

[56] References Cited

U.S. PATENT DOCUMENTS

| Re. 30,525 | 2/1981 | DeLalio | 475/82 X |
|---|---|---|---|
| 2,694,470 | 11/1954 | Gendron | 475/284 X |
| 2,833,160 | 5/1958 | Morgan | 475/82 X |
| 3,165,947 | 1/1965 | Smith | 475/284 X |
| 3,293,943 | 12/1966 | MacDonald | 475/82 X |
| 3,396,607 | 8/1968 | Ross | 475/82 X |
| 3,714,845 | 2/1973 | Mooney, Jr. | 475/81 |
| 3,733,931 | 5/1973 | Nyman et al. | 475/82 X |
| 3,763,918 | 10/1973 | Tipping | 475/82 |
| 3,811,343 | 5/1974 | Mori et al. | 475/284 X |
| 3,863,524 | 2/1975 | Mori et al. | 475/284 X |
| 3,903,755 | 9/1975 | Polak | 475/82 |
| 3,969,958 | 7/1976 | Miyao et al. | 475/81 X |
| 3,979,972 | 9/1976 | Sakai et al. | 475/81 |
| 4,019,404 | 4/1977 | Schauer | 475/82 |
| 4,304,151 | 12/1981 | Meyerle et al. | 475/82 |
| 4,341,131 | 7/1982 | Pollman | 475/81 |
| 4,363,247 | 12/1982 | Weseloh | 475/82 |
| 4,434,681 | 3/1984 | Friedrich et al. | 475/82 |
| 4,682,511 | 7/1987 | Wittke | 475/82 X |
| 4,754,664 | 7/1988 | Dick | 475/81 |
| 5,113,723 | 5/1992 | Ishino et al. | 475/72 X |
| 5,203,747 | 4/1993 | Warren | 475/72 |

FOREIGN PATENT DOCUMENTS

| 63-83438 | 4/1988 | Japan | 475/284 |
|---|---|---|---|
| 4-19449 | 1/1992 | Japan | 475/284 |
| 5-215200 | 8/1993 | Japan | 475/72 |
| 5-332418 | 12/1993 | Japan | 475/72 |
| 6-101744 | 4/1994 | Japan | 475/72 |
| 997085 | 6/1965 | United Kingdom | 475/72 |

*Primary Examiner*—Charles A. Marmor
*Assistant Examiner*—Nathan O. Jensen
*Attorney, Agent, or Firm*—Calvin E. Glastetter

[57] ABSTRACT

A split torque transmission includes a hydrostatic transmission and a mechanical transmission both being driven by an engine. The output of the hydrostatic transmission and the mechanical transmission are both selectively coupled to a machine through a final output shaft. The mechanical transmission incudes a full range high forward and reverse mechanism selectively coupled to a planetary arrangement. The planetary arrangement sums the speed of the hydrostatic transmission with the full range high forward and reverse mechanism. This arrangement provides a smooth and continuous change in the speed of the machine in both the forward and reverse directions throughout its entire speed range which is identical in both directions of travel.

7 Claims, 8 Drawing Sheets

Fig_1_

019
SPLIT TORQUE TRANSMISSION

TECHNICAL FIELD

This invention relates generally to a split torque transmission and more particularly to a transmission arrangement having a full range high forward and reverse mechanism coupled to a single summing planetary.

BACKGROUND ART

In a machine, such as a wheel loader, for example, an engine supplies power for propelling the machine in the forward or reverse directions as well as supply power for the machine implements. A transmission is coupled to the engine and transmits power from the engine to the drivetrain to propel the machine. It is desirable to utilize a split torque transmission and have the transmission do more work to thereby save engine power for the implements. Because machines such as a wheel loader operate at relatively low speeds and in cyclical work routines, there is a need to control speed precisely at low speeds and to be infinitely adjustable throughout the full range. One of the problems associated with such an arrangement is that the mechanical input does not have a full range high forward and reverse mechanism which can be selectively coupled to a single summing planetary.

The present invention is directed to overcoming one or more of the problems as set forth above.

DISCLOSURE OF THE INVENTION

In accordance with one aspect of the present invention, a split torque transmission is provided for a machine having a source of power, such as an engine, and an output. The split torque transmission includes a hydrostatic transmission having a variable displacement pump drivingly connected to the source of power and a variable displacement motor having an output shaft being fluidly connected to the variable displacement pump. A mechanical transmission is also provided and is drivingly connected to the source of power. The mechanical transmission has a full range high forward and reverse mechanism connected to the source of power, a planetary arrangement connected to both the full range high forward and reverse mechanism and the output shaft of the variable displacement motor. The planetary arrangement is operative to sum the outputs from the full range mechanism and the variable displacement motor. A final output shaft is connected between the planetary arrangement and the output.

BEST MODE FOR CARRYING OUT THE INVENTION

Figure 1:
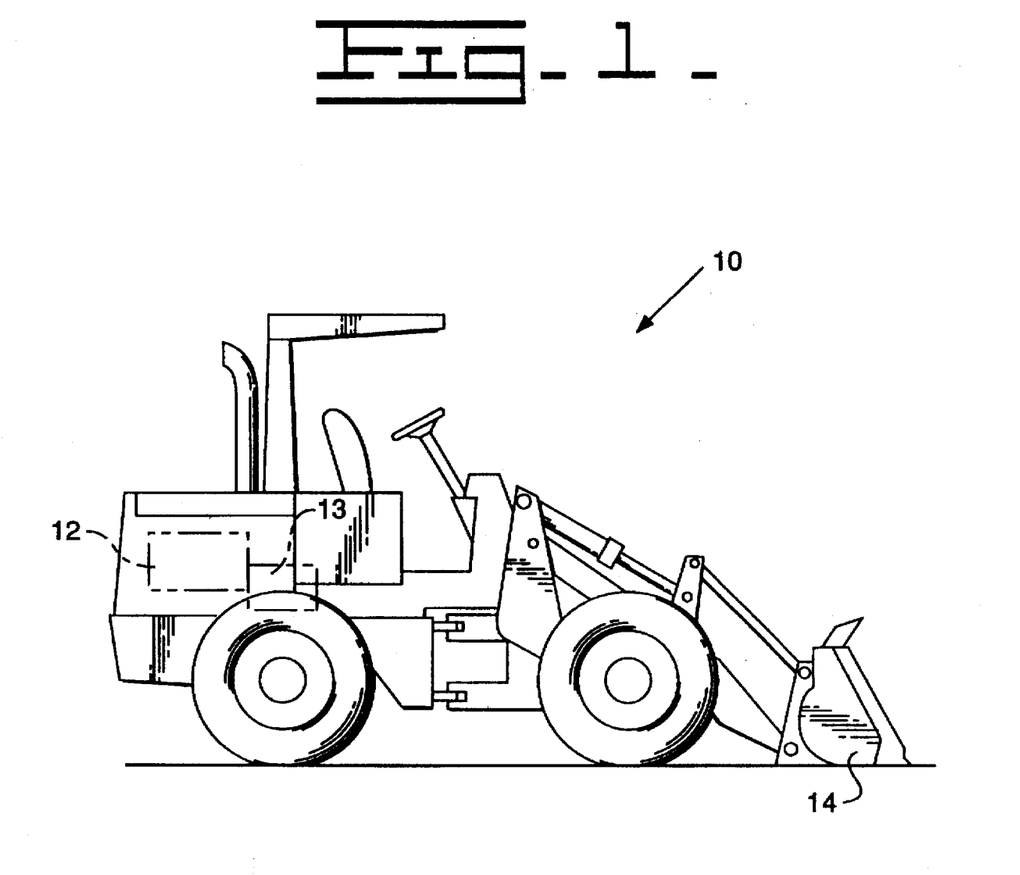
FIG. 1 is a side view of a machine having an engine and transmission.

Referring to FIG. 1, a machine 10 has an engine 12 and a split torque transmission 13 which directs power from the engine 12 to propel the machine 10 in a forward or reverse direction. The machine 10 is equipped with an implement or bucket 14 for performing various work tasks. The machine 10 as illustrated is a wheel loader that uses the bucket 14 to move material from one location to another. Typically the machine pushes the bucket into the material to fill the bucket 14 then moves in the reverse direction to carry the material to a new location. These operations are usually carried out at low speeds on the order of 0–6 miles per hour. It would be advantageous to have a transmission that is efficient in this range and also be infinitely variable throughout a full range high speed forward and reverse direction. The machine is illustrated as a wheel loader as an example of a type of machine that can utilize the present invention. The machine may also be a track type loader, track type tractor or an agricultural tractor which operates at low speeds in cyclical operations.

Figure 2:
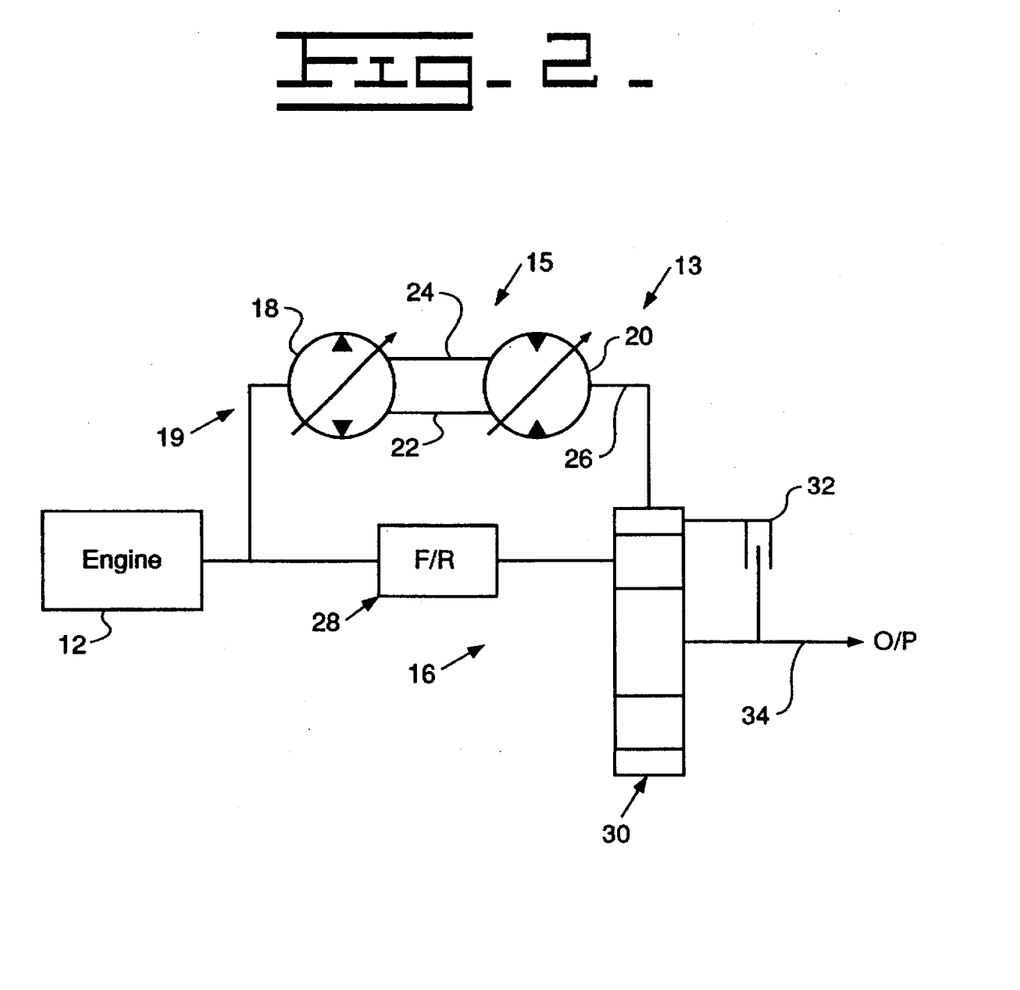
FIG. 2 is a schematic view of a transmission arrangement having a mechanical input and a hydrostatic input.
Figure 3:
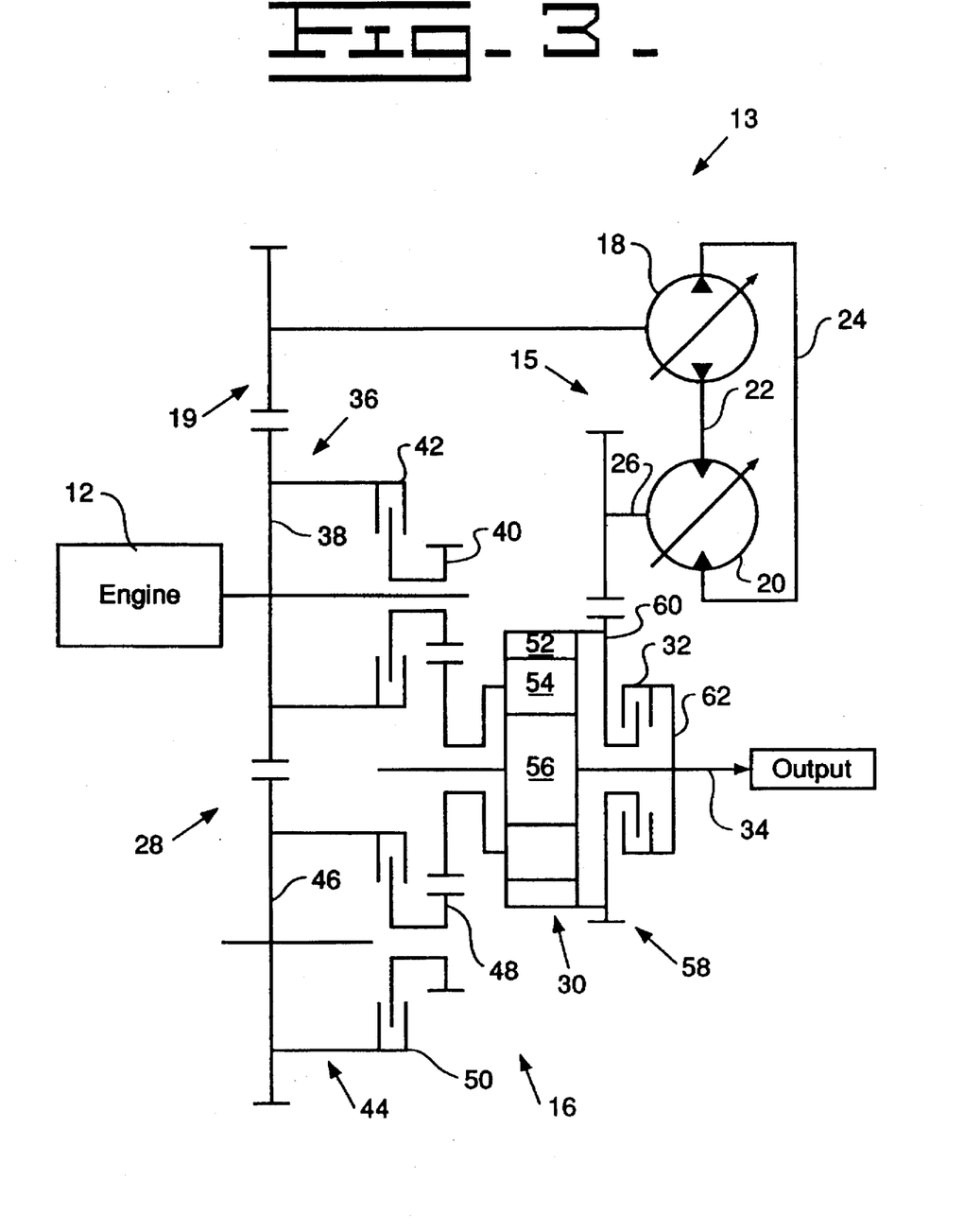
FIG. 3 is a schematic view of the split torque transmission showing a mechanical countershaft input.

Now referring to FIGS. 2 and 3 the split torque transmission 13 includes a hydrostatic transmission 15 and a mechanical transmission 16. The hydrostatic transmission 15 includes a variable displacement pump 18 drivingly connected to the engine 12. The variable displacement pump 18 is drivingly connected to the engine 12 through a pump drive arrangement 19. A variable displacement motor 20 is fluidly connected to the variable displacement pump 18 through conduits 22, 24. An output shaft 26 extends from the variable displacement motor 20 and is operative to transmit torque therefrom.

The mechanical transmission 16 includes a full range high forward and reverse mechanism 28, a single summing planetary arrangement 30, a low speed clutch 32 and a final output shaft 34 connected to the drivetrain (not shown) of the machine 10.

Now referring to FIG. 3, an example of the full range high forward and reverse mechanism 28 is shown as using the same connections to the summing planetary 30 as shown in FIG. 2. The full range high forward and reverse gear mechanism 28 includes a first gear mechanism 36 having an input 38 drivingly connected to the engine 12 and an output 40 with a first fluid operated clutch 42 disposed therebetween. A second gear mechanism 44 has an input 46 drivingly connected to the engine 12 and an output 48 with a second fluid clutch 50 disposed therebetween.

The planetary arrangement 30 typically includes a ring gear 52, a carrier and planet gears 54 and a sun gear 56. The ring gear 52 is operatively connected to the output shaft 26 of the variable displacement motor 20. The carrier and planet gears 54 are operatively connected to the output 40 of the first gear mechanism 36 and the output 48 of the second gear mechanism 44. The sun gear 56 is operatively connected to the final output shaft 34. A third gear mechanism 58 includes an input 60 operatively connected to the ring gear 52, an output 62 connected to the final output shaft 34 and the low or third fluid clutch 32 disposed therebetween.

Figure 4:
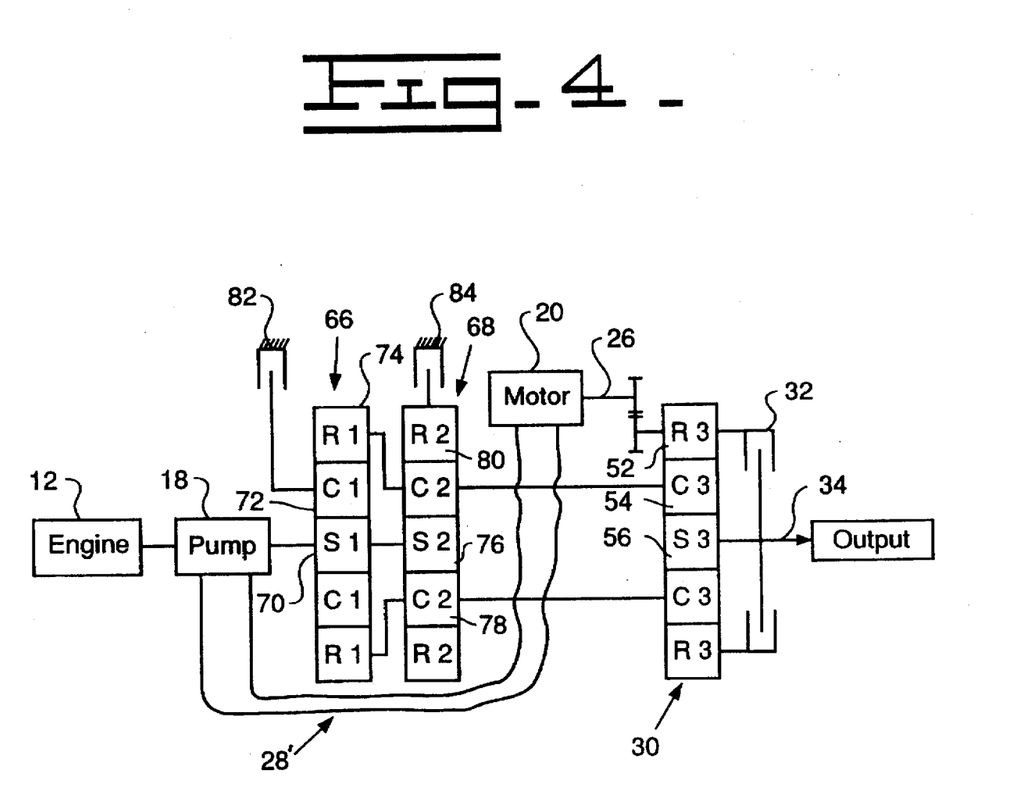
FIG. 4 is a schematic view of the split torque transmission showing a mechanical planetary input.

Now referring to FIG. 4 an alternate example of the full range high forward and reverse mechanism 28' using the same connection to the summing planetary 30, as shown in FIG. 2 is disclosed. Reference numerals for items similar in previous Figs. will be repeated. The full range high forward and reverse mechanism 28', in this arrangement, includes a first planetary 66 and a second planetary 68. The first planetary 66 includes a sun gear 70, a planet and carrier gears 72 and a ring gear 74. The second planetary 68 includes a sun gear 76, a carrier and planet gears 78 and a ring gear 80. The engine 12 drives the variable displacement pump 18 and is also coupled to both sun gears 70, 76. The carrier and planet gears 72 of the first planetary 66 can be stopped by a nonrotating clutch 82 to obtain high reverse direction. The ring gear 74 of the first planetary 66 is coupled to the carrier and planet gears 78 of the second planetary 68. The ring gear 80 of the second planetary 68 can be stopped by a nonrotating clutch 84 to obtain high forward direction. The single summing planetary 30 is provided to combine the mechanical input and the hydrostatic input. The summing planetary 30 includes the sun gear 56, the carrier and planet gears 54 and the ring gear 52. The planet and carrier gears 78 of the second planetary 68 is connected to the carrier and planet gears 54 of the summing planetary 30. The variable displacement pump 18 is fluidly connected to the variable displacement motor 20. The motor 20 is connected to the ring gear 52 of the summing planetary 30. The final output shaft 34 connects the sun gear 56 to the drivetrain of the machine 10. The low speed clutch 32 is provided to selectively couple the ring gear 52 to the final output shaft 34. Engaging the low clutch 32 yields full hydrostatic operation in both low forward and low reverse modes with the summing planetary 30 locked to rotate as a unit.

Figure 5:
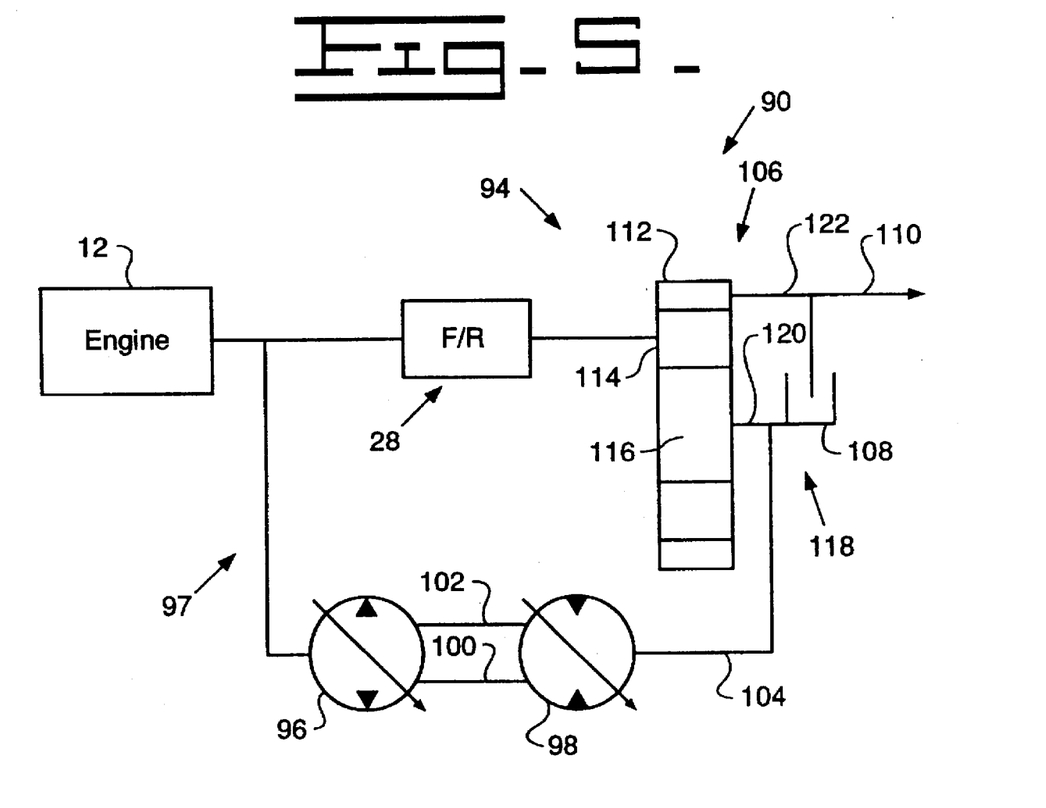
FIG. 5 is a schematic view of a split torque transmission arrangement showing an alternate hydrostatic input arrangement.
Figure 6:
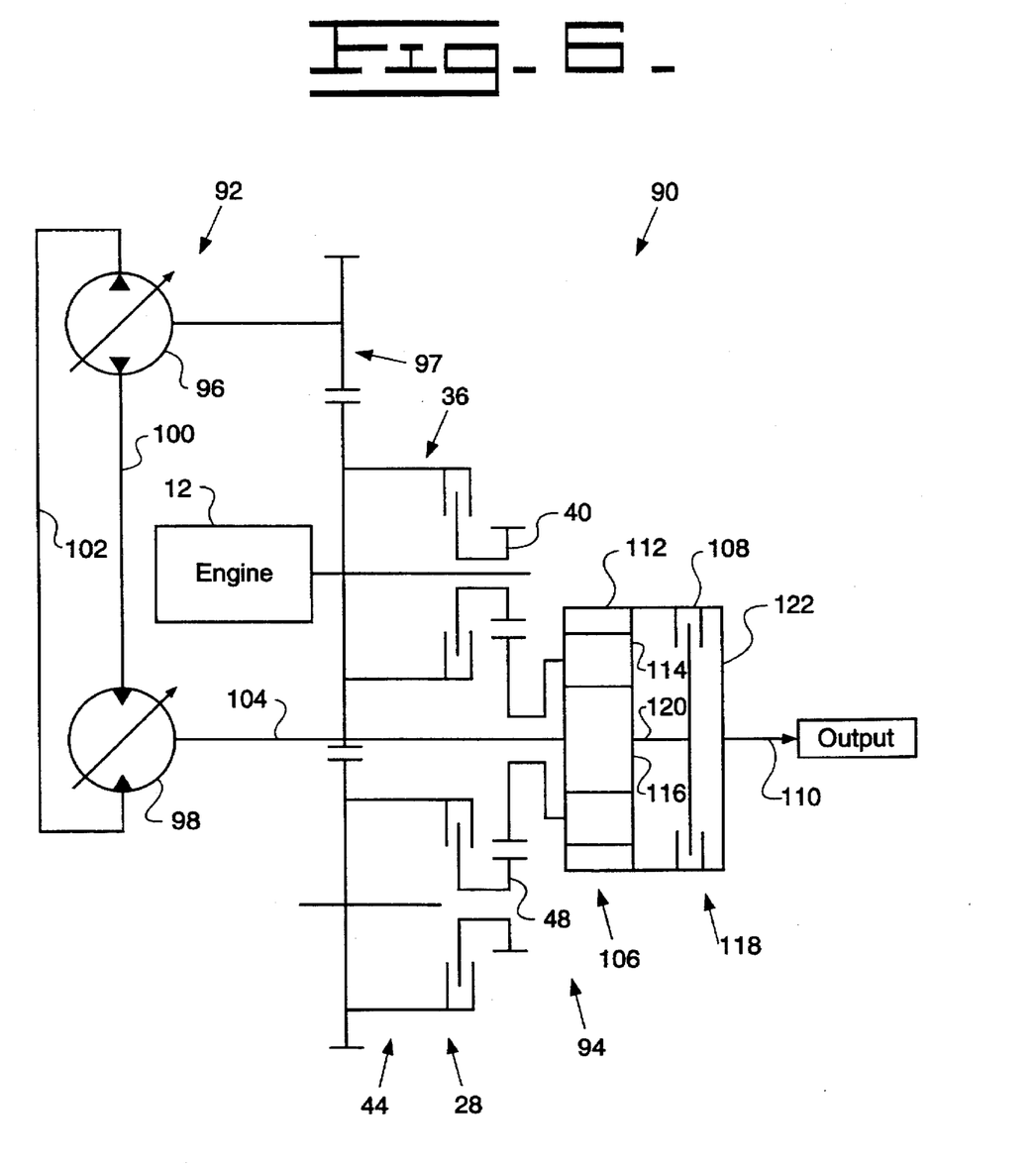
FIG. 6 is a schematic of the alternate arrangement showing a mechanical countershaft input.

Now referring to FIGS. 5 and 6 an alternate split torque transmission arrangement 90 is disclosed. The arrangement 90 is similar to the arrangement shown in FIG. 2, however the hydrostatic input is connected to the sun gear of the summing planetary. The split torque transmission 90 includes a hydrostatic transmission 92 and a mechanical transmission 94. The hydrostatic transmission 92 includes a variable displacement pump 96 drivingly connected to the engine 12 through a pump drive arrangement 97. A variable displacement motor 98 is fluidly connected to the variable displacement pump through conduits 100, 102. Output shaft 104 extends from the variable displacement motor 98 and is operative to transmit torque therefrom.

The mechanical transmission 94 includes the full range high forward and reverse mechanism 28, as previously described, a single summing planetary 106, a low speed clutch 108 and a final output 110 connected to the drivetrain of the machine 10.

The planetary arrangement 106 typically includes a ring gear 112, a carrier and planet gears 114 and a sun gear 116. The ring gear 112 is directly connected to the final output 110. The carrier and planet gears 114 is operatively connected to the output 40 of the first gear mechanism 36 and the output 48 of the second gear mechanism 44 of the full range high forward and reverse mechanism 28. The sun gear 116 is operatively connected to the output shaft 104 of the variable displacement motor 98. An output arrangement 118 includes an input 120 operatively connected to the sun gear 116 an output 122 connected to the final output 110 and the low clutch 108 disposed therebetween.

Figure 7:
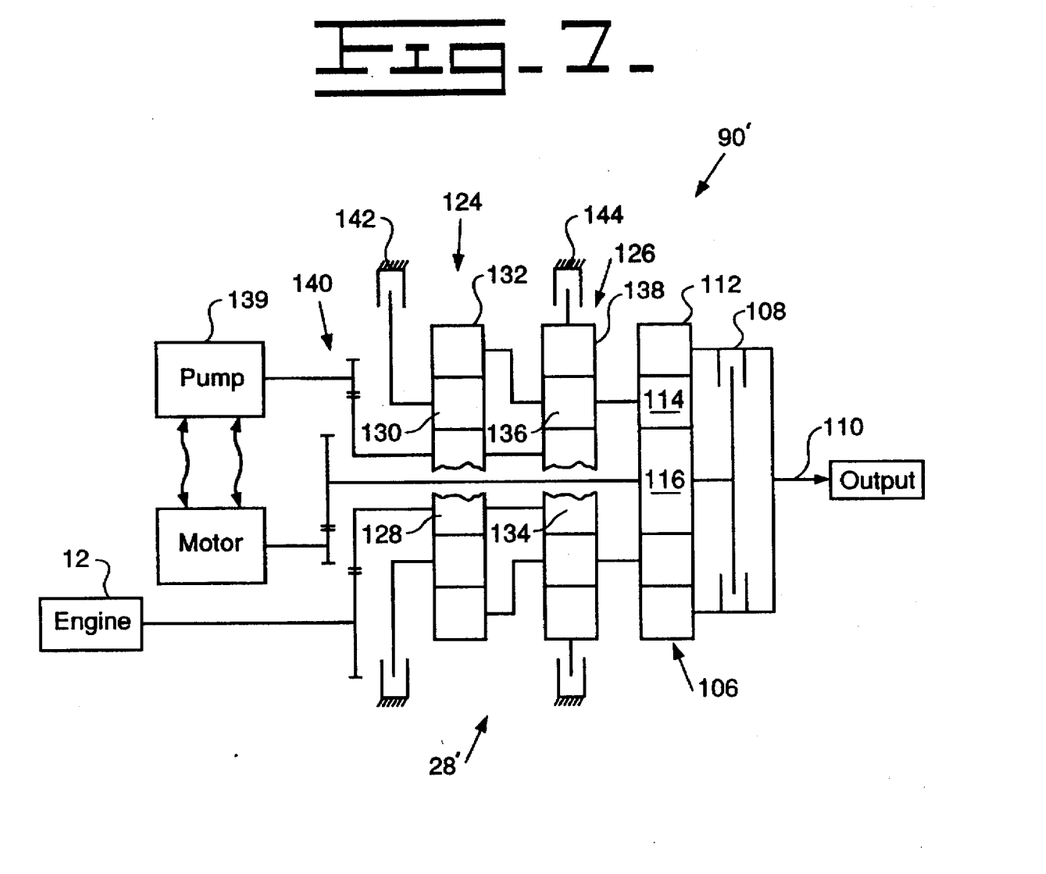
FIG. 7 is a schematic of the alternate arrangement showing a mechanical planetary input.

Now referring to FIG. 7 a split torque transmission 90' similar to the transmission shown in FIGS. 5 and 6 is disclosed, however an alternate full range high forward and reverse mechanism 28' is shown. The full range high forward and reverse mechanism 28' includes a first planetary 124 and a second planetary 126. The first planetary 124 includes a sun gear 128, a carrier and planet gears 130 and a ring gear 132. The second planetary 126 includes a sun gear 134, a carrier and planet gears 136 and a ring gear 138. The engine 12 drives a variable displacement pump 139 through a gear arrangement 140 and the engine 12 also drives the sun gears 128, 134 through the gear arrangement 140. The carrier and planet gears 130 of the first planetary 124 can be stopped by a nonrotating clutch 142 to obtain high reverse direction. The ring gear 132 of the first planetary 126 is coupled to the carrier and planet gears 136 of the second planetary 126. The ring gear 138 of the second planetary 126 can be stopped by a nonrotating clutch 144 to obtain high forward direction. The carrier and planet gears 136 of the second planetary 126 is connected to the carrier and planet gears 114 of the planetary arrangement 106.

Figure 8:
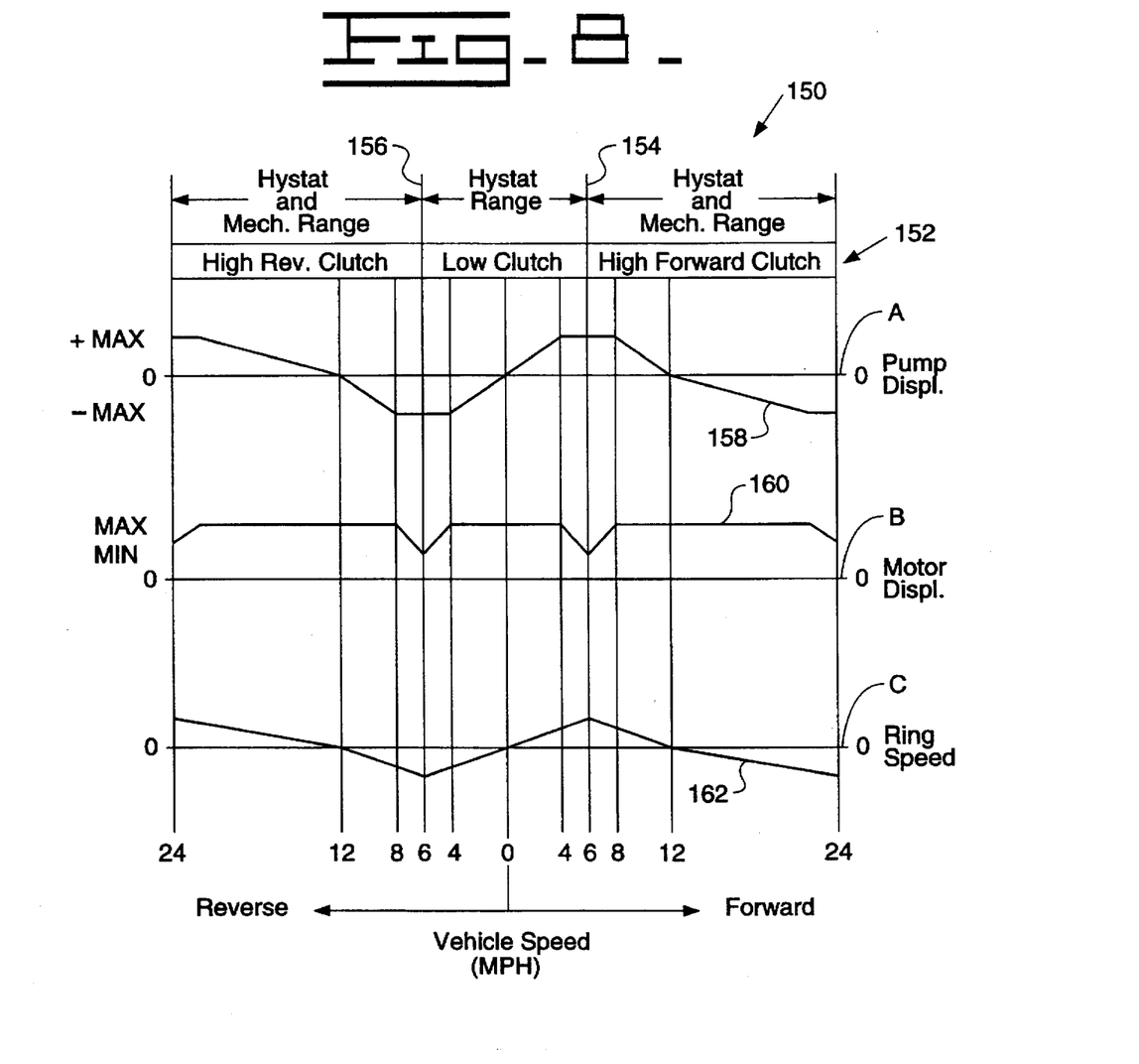
FIG. 8 is a schematic representation of a graph showing the change in the varies components relative to vehicle speed.

Now referring to FIG. 8 a graph 150 discloses the changes to the various components as increasing in machine speed from a stop until maximum speed is achieved in both forward and reverse direction. The graph 150 shows the changes to the various components when the variable motor is connected to the ring gear, as in FIGS. 2, 3 and 4. When the motor is connected to the sun gear the various components may change at different points along the line. A box chart 152 across the top of the graph 150 indicates which one of the clutches is engaged at what speed. The low clutch is disengaged and the high forward clutch is engaged, shown by a line 154, which is at 6 mph forward machine speed. The low clutch is disengaged and the high reverse clutch is engaged, shown by a line 156, which is at 6 mph reverse machine speed. A line 158 represents the displacement of the pump 18. A line 160 represents the displacement of the motor 20. A line 162 represents the speed of the ring gear 52 of the summing planetary 30.

INDUSTRIAL APPLICABILITY

The split torque transmission 13 constructed in accordance with the teachings of the present invention provides a transmission wherein the hydrostatic transmission 15 and the mechanical transmission 16 interact to provide a continuously variable and efficient output which enables the engine 12 to operate at its best efficiency.

The following description will describe the changes which occur within the split torque transmission where the variable displacement motor is connected to the ring gear of the summing planetary.

In the operation of the subject invention, with the engine 12 operating at a predetermined speed level, the variable displacement pump 18 is at its zero displacement 158 position, the displacement 160 of the motor is at the maximum position and the clutches 32, 42, 50 are disengaged, the ring gear 52 is stopped and the machine is at zero speed. If the operator elects to move the machine forward, for example, zero to 4 mph, the low clutch 32 is engaged to effectively lock the ring gear 52 and the sun gear 56 to the final output 34, the displacement 158 of the pump 18 will move from the zero position to its maximum position, the motor displacement 160 will be maintained at its maximum position and the speed 162 of the ring gear 52 will increase. As displacement 158 of the variable displacement pump increases, pressurized fluid is directed through the conduit 22 to the variable displacement motor 20 and back to the variable displacement pump through the conduit 24 in a closed loop. Pressurized fluid being directed through the variable displacement motor 20 causes the output shaft 26 of the variable displacement motor 20 to rotate. Since the output shaft 26 of the variable displacement motor 20 is operatively connected to the ring gear 52 and the third gear mechanism 58, the final output shaft 34 is caused to rotate.

From 4 mph to 6 mph the displacement 158 of the variable displacement pump 18 will remain at its maximum, the displacement 160 of the variable displacement motor 20 will move toward its minimum position, the speed 162 ring gear will still be increasing. The speed of the final output shaft 34, when operating in the low range, is controlled by increasing or decreasing the speed of the variable displacement motor 20. This may be done in a continuous fashion by manipulating the volumetric displacements 158, 160 of the pump 18 and motor 20 in a commonly known manner. Since the pump and motor displacements are changed in a smooth and continuous manner, an infinitely variable transmission is provided. At line 154 which is 6 mph the low clutch 32 is disengaged, unlocking the ring gear 52 and the sun gear 56 from the final output 34, and the high forward clutch 42 is engaged thus drivingly connecting the engine 12 to the carrier and planet gears 54 of the summing planetary 30, the displacement 158 of the variable displacement pump 18 is at its maximum position, the displacement 160 of the variable displacement motor 20 is at its minimum position and the speed 162 of the ring gear 52 is at its maximum. From line 154 which is 6 mph to 24 mph the hydrostatic transmission 15 and the mechanical transmission 16 interact to increase the machine speed.

From 6 mph to 8 mph the high forward clutch 42 is engaged, the displacement 158 of the variable displacement pump 18 is maintained at its maximum position, the displacement 160 of the variable displacement motor 20 is increased from its minimum position to its maximum position and the speed 162 of the ring gear 52 is decreasing. Before the high forward clutch 42 is engaged, it is desirable that the speed of the input of the first gear mechanism 36 is substantially equal to the output of the first gear mechanism 36 that is connected to the carrier and planet gears 54. In order to insure that the speeds are the same, the displacement 160 of the motor 20 can be slightly adjusted as needed. Once the shift has been performed, the carrier and planet gears are at the same level as the speed of the input of the first gear mechanism. In order to continue the increase in machine speed the displacement 160 of the variable displacement motor 20 is increased which effectively slows the rotational speed of the output shaft 26.

Since the final output shaft 34 is now being driven through the sun gear 56, reduction in the speed of the ring gear 52 results, in a well known manner, in an increase in the speed of the sun gear 56 due to the operation of the summing planetary 30. The displacement 160 of the variable displacement motor 20 is continually increased to a point at which the desired level of 8 mph is achieved in the final output shaft 34.

From 8 mph to 12 mph the high forward clutch 42 remains engaged, the displacement 158 of the variable displacement pump moves from its maximum position to the zero position, the displacement 160 of the of the variable displacement motor 20 is maintained at its maximum position and the speed 162 of the ring gear 52 will move toward zero.

At 12 mph the displacement 158 of the variable displacement pump 18 will go through its zero point and stroke the variable displacement pump 18 in the opposite direction to cause the variable displacement motor 20 to turn in the opposite direction which results in the ring gear being rotated in the opposite direction. The speed of the machine can be increased until the design speed limits on the variable displacement motor 20 or the output components are reached.

From 12 mph to the speed limits the displacement 158 is moved from the zero position toward its maximum position, however in the opposite direction, when the maximum position is achieved it will remain in this position until maximum machine speed is achieved. The displacement 160 of the variable displacement motor 20 is maintained at its maximum position until a predetermined point where its displacement will move toward the minimum position. The ring gear 52 speed continues to increase until the motor reaches minimum displacement.

It is recognized that as the speed of the machine is increased, the available torque at the final output shaft 26 is reduced. From the above description, it should be recognized that the speed of the machine can be increased from zero speed to some predetermined maximum level at a smooth and continuous manner. This is accomplished by the interaction between the hydrostatic transmission 15 and the mechanical transmission 16.

In the subject arrangement, the machine can be operated in reverse through the same speed ranges as set forth above with respect to operating in a forward direction. When being operated in a reverse direction the variable displacement pump 18 is stroked in the direction to provide pressurized fluid through the conduit 24 to the variable displacement motor 20 resulting in the output shaft 26 thereof rotating in the opposite direction to that previously described with respect to traveling in a forward direction. In reverse direction the high reverse clutch 50 is engaged as shown by line 156.

Other aspects, objects and advantages of the present invention can be obtained from a study of the drawings, the disclosure and the appended claims.

We claim:

1. A split torque transmission for a machine having a source of power and an output, comprising:

a hydrostatic transmission having a variable displacement pump drivingly connected to the source of power and a variable displacement motor having an output shaft and being fluidly connected to the variable displacement pump; and a mechanical transmission drivingly connected to the source of power and having a full range high forward and reverse mechanism connected to the source of power, a planetary arrangement having a carrier and planet gears connected to the full range high forward and reverse mechanism, a ring gear connected to the output shaft of the variable displacement motor and selectively connectable to the output, a sun gear connected to the output and selectively connectable to the ring and operative to sum the outputs from the full range high forward and reverse mechanism and the variable displacement motor.

2. The split torque transmission of claim 1 wherein the full range high forward and reverse mechanism and the hydrostatic transmission both act through the summing planetary arrangement to provide a continuing increase in the speed of the output with a corresponding decrease in the speed of the output shaft from the variable displacement motor.

3. The split torque transmission of claim 1 wherein the output shaft of the variable displacement motor is selectively connected to the output by a fluid clutch.

4. The split torque transmission of claim 1 wherein the planetary arrangement is a single planetary.

5. The split torque transmission of claim 1 wherein the full range mechanism is a countershaft gear train having a forward clutch and a reverse clutch.

6. The split torque transmission of claim 1 wherein the full range mechanism is connected to the carrier and planet gears of the summing planetary.

7. The split torque transmission of claim 1 wherein the variable motor is connected to the sun gear of the summing planetary.

* * * * *